US012750690B2

(12) United States Patent
Song et al.

(10) Patent No.: US 12,750,690 B2
(45) Date of Patent: Sep. 29, 2026

(54) METHOD FOR TRANSMITTING TARGET OBJECT BASED ON SPATIAL INFORMATION CORRESPONDING TO REFERENCE RESOURCE, COMMUNICATION DEVICE, AND NON-TRANSITORY READABLE STORAGE MEDIUM

(71) Applicant: VIVO MOBILE COMMUNICATION CO., LTD., Dongguan (CN)

(72) Inventors: Yang Song, Dongguan (CN); Hao Liu, Dongguan (CN); Peng Sun, Dongguan (CN)

(73) Assignee: VIVO MOBILE COMMUNICATION CO.,LTD., Dongguan (CN)

( * ) Notice: Subject to any disclaimer, the term of this patent is extended or adjusted under 35 U.S.C. 154(b) by 590 days.

(21) Appl. No.: 18/099,549

(22) Filed: Jan. 20, 2023

(65) Prior Publication Data

US 2023/0156488 A1 May 18, 2023

Related U.S. Application Data

(63) Continuation of application No. PCT/CN2021/115055, filed on Aug. 27, 2021.

(30) Foreign Application Priority Data

Aug. 28, 2020 (CN) ......................... 202010889951.4

(51) Int. Cl.
*H04W 16/28* (2009.01)
*H04B 17/318* (2015.01)
*H04L 5/00* (2006.01)

(52) U.S. Cl.
CPC .......... *H04W 16/28* (2013.01); *H04B 17/318* (2015.01); *H04L 5/0094* (2013.01)

(58) Field of Classification Search
None
See application file for complete search history.

(56) References Cited

U.S. PATENT DOCUMENTS

2021/0337584 A1* 10/2021 Zhang .................. H04W 72/23
2022/0225120 A1* 7/2022 Matsumura ........... H04L 5/0023
(Continued)

FOREIGN PATENT DOCUMENTS

CN 110535591 A 12/2019
CN 111132354 A 5/2020

OTHER PUBLICATIONS

CMCC, "Remaining issues on multi-TRP/panel transmission", 3GPP TSG RAN WG1 #100bis, e-Meeting, Apr. 20-30, 2020, R1-2002212.
(Continued)

*Primary Examiner* — Ayaz R Sheikh
*Assistant Examiner* — Christopher R Davis
(74) *Attorney, Agent, or Firm* — The Webb Law Firm

(57) ABSTRACT

A transmission method includes: in a case that first spatial information of a target object is determined based on second spatial information corresponding to a reference resource and that the reference resource corresponds to multiple pieces of second spatial information, determining, by a communication device, that the first spatial information of the target object corresponds to target spatial information, where the target spatial information is one or more of the multiple pieces of second spatial information; and transmitting the target object based on determined first spatial information.

18 Claims, 5 Drawing Sheets

(56) References Cited

U.S. PATENT DOCUMENTS

| | | | | |
|---|---|---|---|---|
| 2022/0295304 | A1* | 9/2022 | Matsumura ....... | H04W 72/1273 |
| 2023/0058303 | A1* | 2/2023 | Matsumura ........... | H04L 5/0048 |
| 2023/0224726 | A1* | 7/2023 | Kim ....................... | H04B 7/024<br>370/329 |

OTHER PUBLICATIONS

ZTE, "Maintenance of multi-TRP enhancements", 3GPP TSG RAN WG1 Meeting #100bis-e, e-Meeting, Apr. 20-30, 2020, R1-2001596.
Nokia et al., "Feature lead summary on QCL", 3GPP TSG RAN WG1#92bis R1-1805660, Sanya, People Republic of China, Apr. 16-20, 2018.
Qualcomm Incorporated, "SSB arrangements, BWP operation and other issues for NTN", 3GPP TSG RAN WG1 #102e R1-2006807, e-Meeting, Aug. 17-28, 2020.
LG Electronics, "FL summary#2 on Rel-16 MB1 maintenance", 3GPP TSG RAN WG1 #101, e-Meeting, May 25-Jun. 5, 2020, R1-2003931.
Qualcomm Incorporated, "Enhancements on Multi-beam Operation", 3GPP TSG RAN WG1 Meeting #102-e, Aug. 17-28, 2020, R1-2006790.
Samsung, "On Rel.16 multi-TRP/panel transmission", 3GPP TSG RAN WG1#101-e, e-Meeting, May 25-Jun. 5, 2020, R1-2003881.
Vivo, "Remaining issues on Multi-TRP operation", 3GPP TSG RAN WG1 #102-e, e-Meeting, Aug. 17-28, 2020, R1-2005354.
ZTE, "Maintenance of multi-TRP enhancements", 3GPP TSG RAN WG1 Meeting #102-e, e-Meeting, Aug. 17-28, 2020, R1-2005451.

* cited by examiner

METHOD FOR TRANSMITTING TARGET OBJECT BASED ON SPATIAL INFORMATION CORRESPONDING TO REFERENCE RESOURCE, COMMUNICATION DEVICE, AND NON-TRANSITORY READABLE STORAGE MEDIUM

CROSS-REFERENCE TO RELATED APPLICATIONS

This application is a Bypass Continuation Application of PCT/CN2021/115055 filed Aug. 27, 2021, and claims priority to Chinese Patent Application No. 202010889951.4 filed Aug. 28, 2020, the disclosures of which are hereby incorporated by reference in their entireties.

BACKGROUND OF THE INVENTION

Field of the Invention

This disclosure belongs to the field of wireless communication technologies, and in particular, relates to a transmission method and apparatus, a communication device, and a terminal.

Description of Related Art

In the related art, spatial information of an uplink/downlink channel or an uplink/downlink signal needs to be determined based on spatial information of a reference resource in some cases. The spatial information of the uplink/downlink channel or the uplink/downlink signal mainly includes: spatial information used for receiving the downlink channel or the downlink signal in a case that the spatial information for receiving the downlink channel or the downlink signal cannot be determined in the case of not being configured, activated, indicated, or the like, where the downlink channel includes a physical downlink shared channel (PDSCH), a cross-component carrier (CC) scheduled PDSCH, and the like, and the downlink signal includes an aperiodic channel state information reference signal AP-CSI-RS), and the like; and spatial information used for sending the uplink channel or the uplink signal in a case that the spatial information for sending the uplink channel or the uplink signal cannot be determined in the case of not being configured, activated, indicated, or the like, where the uplink channel includes a physical uplink shared channel (PUSCH), a physical uplink control channel (PUCCH), and the like, and the uplink signal includes a sounding reference signal (SRS) and the like. In the foregoing cases, the spatial information used for receiving the downlink channel or the downlink signal and the spatial information used for sending the uplink channel or the uplink signal usually correspond to spatial information of reference resources, where the reference resource may be a control resource set (CORESET), a physical downlink control channel (PDCCH) for scheduling the downlink channel/signal or the uplink channel/signal, or another channel/signal.

For example, when a terminal (User Equipment, UE, also referred to as terminal device) is set to "enabled" in a higher-layer parameter tci-PresentInDCI configured for a CORESET, the UE considers that downlink control information (DCI) format 1_1 or DCI format 1_2 in a PDCCH transmitted on the CORESET includes a transmission configuration indication (TCI) field, where the field is used to indicate information including a spatial reception beam, for example, a TCI state. The UE can correctly interpret the TCI state and determine a reception beam used for receiving a PDSCH scheduled by the PDCCH, only after DCI has been detected. It takes time for the UE to detect the DCI and switch a beam according to the indicated TCI in the DCI. If the DCI format 1_1 indicates that a time offset for scheduling the PDSCH, namely, a symbol interval between the last symbol of a PDCCH where the DCI is located and the first symbol of a single-slot or multi-slot PDSCH scheduled by the PDCCH, is greater than or equal to a threshold timeDurationForQCL, the UE may receive a PDSCH of a serving cell by using a reception beam indicated by the TCI field in the DCI, that is, the UE may consider that a demodulation reference signal (DMRS) port of the single-slot or multi-slot PDSCH is quasi co-located (QCL) with a reference signal (RS) in the TCI state indicated by the TCI field. In a case that the higher-layer parameter tci-PresentInDCI configured for the CORESET is set to "enabled", or that the higher-layer parameter tci-PresentInDCI has not been configured, if all TCI codepoints activated by a medium access control (MAC) control element (CE) are mapped onto one TCI state, and the foregoing time offset is less than timeDurationForQCL, but the UE has not finished detection of the DCI or switching of the reception beam at that time, the UE may use a default reception beam to buffer received signals on these symbols, so as to demodulate the scheduled PDSCH after the DCI has been detected successfully. The UE may use the default reception beam to receive the PDSCH, that is, the UE may consider that the DMRS port for the PDSCH of the serving cell is QCLed with an RS in a QCL parameter indicated by a PDCCH QCL in a CORESET, where the CORESET is a CORESET that has the smallest CORESET ID and that is associated with a monitored search space (SS) in one or more CORESETs on an activated bandwidth part (BWP) in a serving cell monitored by the UE in a latest slot.

However, in some scenarios, a reference resource of an uplink/downlink channel or an uplink/downlink signal may correspond to multiple pieces of spatial information. In this case, a communication device cannot determine spatial information of the uplink/downlink channel or uplink/downlink signal. For example, in a multi-transmission and reception point (TRP) scenario, as a reliability-enhancing implementation for control channels, a PDCCH is sent by multiple TRPs to reduce the probability of beam link failure. In this case, the PDCCH may correspond to multiple TCI states or QCLs. If the UE considers that the DMRS port for the PDSCH of the serving cell is QCLed with the RS in the QCL parameter indicated by the PDCCH QCL in the CORESET, the UE cannot determine spatial information for receiving the PDSCH because the PDCCH corresponds to multiple different TCI states or QCLs.

SUMMARY OF THE INVENTION

According to a first aspect, a transmission method is provided. The method includes: in a case that first spatial information of a target object is determined based on second spatial information corresponding to a reference resource, determining, by a communication device, that the first spatial information of the target object corresponds to target spatial information, where the reference resource corresponds to multiple pieces of second spatial information, and the target spatial information is one or more of the multiple pieces of second spatial information; and transmitting the target object based on determined first spatial information. According to a second aspect, a transmission apparatus is provided. The apparatus includes: a first determining module, configured to: in a case that first spatial information of a target object is determined based on second spatial information corresponding to a reference resource and that the reference resource corresponds to multiple pieces of second spatial information, determine that the first spatial information of the target object corresponds to target spatial information, where the target spatial information is one or more of the multiple pieces of second spatial information; and a transmission module, configured to transmit the target object based on determined first spatial information.

According to a third aspect, a method for determining a monitoring occasion is provided. The method includes: in a case that a search space associated with CORESET #0 is configured with multiple spatial relationships and that the multiple spatial relationships correspond to multiple synchronization signal and PBCH blocks, and that different synchronization signal and PBCH blocks corresponding to different spatial relationships, determining, by a terminal, a monitoring occasion of the search space based on one synchronization signal and PBCH block, or determining multiple monitoring occasions of the search space based on the multiple synchronization signal and PBCH blocks.

According to a fourth aspect, an apparatus for determining a monitoring occasion is provided. The apparatus includes: a second determining module, configured to determine that a search space associated with CORESET #0 is configured with multiple spatial relationships, where the multiple spatial relationships correspond to multiple synchronization signal and PBCH blocks, and that different synchronization signal and PBCH blocks correspond to different spatial relationships; and a third determining module, configured to determine a monitoring occasion of the search space based on one synchronization signal and PBCH block, or determine multiple monitoring occasions of the search space based on the multiple synchronization signal and PBCH blocks.

According to a fifth aspect, a communication device is provided. The communication device includes a processor, a memory, and a program or instructions stored in the memory and capable of running on the processor. When the program or instructions are executed by the processor, the steps of the method according to the first aspect are implemented.

According to a sixth aspect, a terminal is provided. The terminal includes a processor, a memory, and a program or instructions stored in the memory and capable of running on the processor. When the program or instructions are executed by the processor, the steps of the method according to the third aspect are implemented.

According to a seventh aspect, a non-transitory readable storage medium is provided. The non-transitory readable storage medium stores a program or instructions. When the program or instructions are executed by a processor, the steps of the method according to the first aspect or the steps of the method according to the third aspect are implemented.

According to an eighth aspect, a chip is provided. The chip includes a processor and a communication interface, where the communication interface is coupled to the processor, and the processor is configured to run a program or instructions of a communication device to implement the method according to the first aspect, or the processor is configured to run a program or instructions of a terminal to implement the method according to the third aspect.

According to a ninth aspect, a computer program product is provided. The computer program product includes a processor, a memory, and a program or instructions stored in the memory and capable of running on the processor. When the program or instructions are executed by the processor, the steps of the method according to the first aspect or the steps of the method according to the third aspect are implemented.

DESCRIPTION OF THE INVENTION

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

In the specification and claims of this disclosure, the terms such as “first” and “second” are intended to distinguish between similar objects but do not necessarily indicate a specific order or sequence. It should be understood that data used in such a way is interchangeable in appropriate circumstances so that the embodiments of this disclosure can be implemented in an order other than the order illustrated or described herein. Moreover, “first” or “second” is used to distinguish typically objects of one type without limiting a quantity of these objects. For example, there may be one or more first objects. In addition, in the specification and claims, “and/or” represents presence of at least one of connected objects, and the symbol “/” in this specification usually indicates an “or” relationship between associated objects.

It should be noted that the technology described in the embodiments of this disclosure is not limited to the long term evolution (LTE) or LTE-Advanced (LTE-A) system, and may also be applied to various wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms “system” and “network” in the embodiments of this disclosure are usually used interchangeably. Techniques described may be used in the aforementioned systems and radio technologies, and may also be used in other systems and radio technologies. However, in the following descriptions, a new radio (NR) system is described for an illustrative purpose, and NR terms are used in most of the following descriptions, although these technologies may also be applied to other applications than an NR system application, for example, the 6-th generation (6G) communication system.

Figure 1:
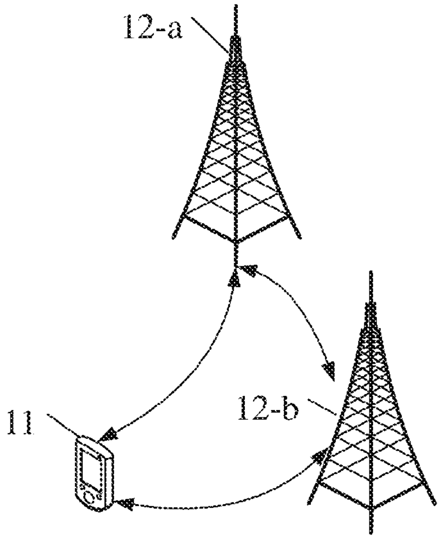
FIG. 1 is a block diagram of a wireless communication system to which the embodiments of this disclosure are applicable.

FIG. 1 is a block diagram of a wireless communication system to which the embodiments of this disclosure are applicable. The wireless communication system includes a terminal 11 and a network-side device 12. The terminal 11 may also be referred to as a terminal device or user equipment (UE). The terminal 11 may be a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device, a vehicle user equipment (VUE), a pedestrian user equipment (PUE), or another terminal-side device. The wearable device includes a wristband, earphones, glasses, and the like. It should be noted that a type of the terminal 11 is not limited in the embodiments of this disclosure. The network-side device 12 may be a base station 12-*a* or a core network 12-*b*. The base station may be referred to as a NodeB, an evolved NodeB, an access point, a base transceiver station (BTS), a radio base station, a radio transceiver, a basic service set (BSS), an extended service set (ESS), a Node B, an evolved Node B (eNB), a home NodeB, a home evolved NodeB, a WLAN access point, a WiFi node, a transmission and reception point (TRP), or other appropriate terms in the art, provided that the same technical effects are achieved. The base station is not limited to technical terminology. It should be noted that in the embodiments of this disclosure, a base station in the NR system is merely used as an example, which does not limit a type of the base station.

With reference to the accompanying drawings, the following describes in detail the transmission method in the embodiments of this disclosure based on some embodiments and application scenarios thereof.

Figure 2:
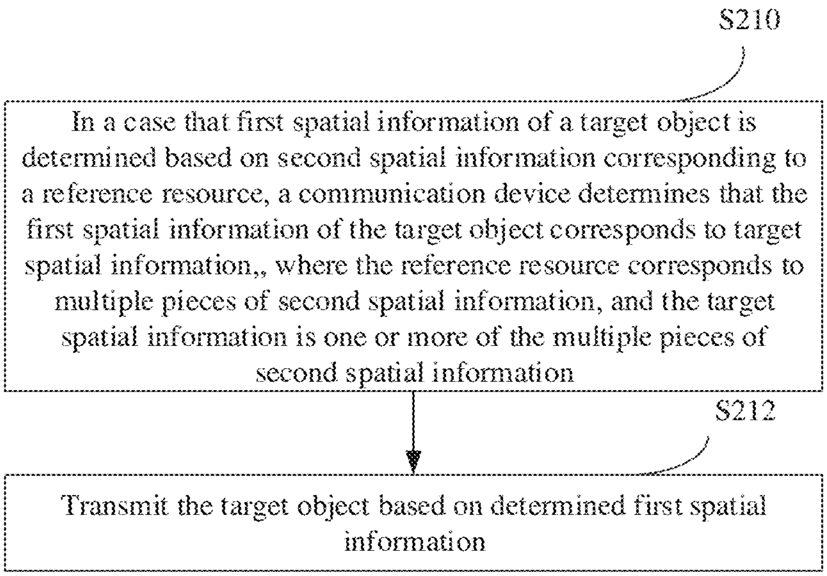
FIG. 2 is a schematic flowchart of a transmission method according to an embodiment of this disclosure.

FIG. 2 is a schematic flowchart of a transmission method according to an embodiment of this disclosure. The method may be performed by a communication device. In other words, the method may be performed by software or hardware installed on the communication device. As shown in FIG. 2, the method may include the following steps.

S210: In a case that first spatial information of a target object is determined based on second spatial information corresponding to a reference resource, a communication device determines that the first spatial information of the target object corresponds to target spatial information, where the reference resource corresponds to multiple pieces of second spatial information, and the target spatial information is one or more of the multiple pieces of second spatial information.

In this embodiment of this disclosure, that first spatial information of a target object is determined based on second spatial information corresponding to a reference resource means that: spatial information indicated by downlink control information cannot be used as the first spatial information of the target object; or the downlink control information does not indicate the first spatial information of the target object.

For example, a higher-layer parameter tci-PresentInDCI configured for a CORESET is set to "enabled", DCI in a PDCCH transmitted on the CORESET uses DCI format 1_1 or DCI format 1_2, and the DCI includes a TCI field, but a symbol interval between the last symbol of the PDCCH where the DCI is located and the first symbol of a single-slot or multi-slot PDSCH scheduled by the PDCCH is less than a first preset threshold (timeDurationForQCL). In this case, the first spatial information of the target object (namely, the PDSCH) is determined based on the second spatial information of the reference resource, where the reference resource may be a CORESET that has the smallest ID in CORESETs associated with a monitored search space of a latest time unit (for example, a slot, a sub-slot, or multiple OFDM symbols (for example, SPANs) in one or more slots).

In this embodiment of this disclosure, that the reference resource corresponds to multiple pieces of second spatial information includes the following cases: The target object corresponds to one reference resource, and the reference resource corresponds to multiple pieces of second spatial information; or the target object corresponds to multiple reference resources, that is, the reference resource includes multiple reference sub-resources, and each reference sub-resource corresponds to one or more pieces of second spatial information.

For example, the reference resource is a PDCCH or a search space. During actual application, the PDCCH may be sent in one of the following manners (1) and (2).

(1) Time-frequency resources of a PDCCH or search space respectively correspond to different pieces of second spatial information at a resource granularity according to a specified rule and are sent through frequency division multiplexing (FDM) or time division multiplexing (TDM). The resource granularity may be control-channel element (CCE), resource element group (REG), REG bundle, precoder granularity, PDCCH candidate, search space monitoring occasion, or the like.

(2) Multiple transmissions of a PDCCH correspond to different pieces of second spatial information that are sent through spatial division multiplexing (SDM), FDM, TDM, or a combination thereof.

Therefore, in a possible implementation, that a PDCCH corresponds to multiple pieces of second spatial information includes at least one of the following cases (1) to (4).

(1) A PDCCH belongs to a search space, or multiple transmissions of the PDCCH belong to a search space, and the search space is associated with a CORESET, where the CORESET corresponds to at least two pieces of second spatial information.

(2) A PDCCH belongs to a search space, or multiple transmissions of the PDCCH belong to a search space, and the search space is associated with at least two CORESETs, where each CORESET corresponds to one piece of second spatial information.

(3) Multiple transmissions of a PDCCH belong to different search spaces, and all the search spaces are associated with a same CORESET, where the CORESET corresponds to at least two pieces of second spatial information.

(4) Multiple transmissions of a PDCCH belong to different search spaces, and each search space is associated with a corresponding CORESET, where each CORESET corresponds to one piece of second spatial information.

In another possible implementation, a terminal is configured as using multiple search spaces for sending a same PDCCH, and that the multiple search spaces correspond to multiple pieces of second spatial information includes at least one of the following cases (1) and (2).

(1) The multiple search spaces are associated with at least two CORESETs, where each CORESET corresponds to one piece of second spatial information.

(2) The multiple search spaces are associated with a same CORESET, where the CORESET corresponds to at least two pieces of second spatial information, and each search space corresponds to one piece of second spatial information of the CORESET.

The at least two pieces of second spatial information corresponding to the PDCCH, the search space, or the CORESET may belong to a same TRP. In a multiple TRP (MTRP) scenario, the at least two pieces of second spatial information corresponding to the PDCCH, the search space, or the CORESET may belong to different TRPs.

In this embodiment of this disclosure, the target spatial information may be one or more of the multiple pieces of second spatial information. Whether the target spatial information is one or more of the multiple pieces of second spatial information may be determined through pre-configuration, agreement or actual scheduling. For example, when the DCI for scheduling the downlink channel/downlink signal or the uplink channel/uplink signal indicates multiple pieces of spatial information, the target spatial information may be some or all of the multiple pieces of second spatial information. Alternatively, when there are multiple pieces of second spatial information for configuring and/or activating the reference resource, the target spatial information may be some or all of the multiple pieces of second spatial information.

In a possible implementation, the target spatial information may be one or more pieces of second spatial information having highest signal strength among the multiple pieces of second spatial information. If the communication device is a terminal, the signal strength may be obtained by measuring received signals corresponding to the multiple pieces of second spatial information. For example, a signal strength of spatial information is obtained by measuring signal quality of a DMRS in a PDCCH transmitted by using the spatial information or quality of an RS transmitted by using the spatial information. In the possible implementation, if the target object is an uplink channel or an uplink signal, using first spatial information corresponding to second spatial information having the highest signal strength to transmit the target object can guarantee transmission reliability of the uplink channel or uplink signal.

Alternatively, in another possible implementation, the target spatial information may be one or more pieces of pre-designated second spatial information among the multiple pieces of second spatial information, for example, the first piece of spatial information of the reference resource.

In another possible implementation, if the reference resource includes multiple reference sub-resources, the target spatial information may be second spatial information corresponding to one or more preset reference sub-resources among the multiple reference sub-resources. For example, if the reference resource includes multiple search spaces for transmitting a same PDCCH, the multiple search spaces are associated with different CORESETs, and each CORESET corresponds to one of multiple pieces of spatial information, the target spatial information may be spatial information that corresponds to a CORESET having the smallest CORESET ID among the multiple CORESETs, or the target spatial information may be a spatial relationship that corresponds to a CORESET associated with a search space among the multiple search spaces.

In the foregoing possible implementation, a quantity of second spatial information corresponding to a preset reference sub-resource may be preset to or agreed to be one or more. For example, a quantity of spatial information (for example, a TCI state or QCI) corresponding to CORESET #0 is specified as one in a protocol. Alternatively, if the target object (for example, a PDSCH or a PUSCH) scheduled and indicated by DCI is transmitted through multiple TRPs, the quantity of second spatial information corresponding to the preset reference sub-resources may also be preset, agreed, or activated to be one or more. In other words, in the possible implementation, the quantity of second spatial information corresponding to the preset reference sub-resources may be preset, agreed, or activated to be the same as a quantity of second spatial information included in the target spatial information.

Alternatively, in another possible implementation, if the reference resource includes multiple reference sub-resources, the target spatial information is one or more pieces of second spatial information having highest signal strength among multiple pieces of second spatial information corresponding to the multiple reference sub-resources. If the communication device is a terminal, the signal strength may be obtained by measuring signals sent by multiple TRPs. For example, the signal strength of spatial information is obtained by measuring signal quality of a DMRS in a PDCCH transmitted by using the spatial information or quality of an RS transmitted by using the spatial information.

In a possible transmission scheme, the target object may have multiple transmission resources, and first spatial information used for transmitting the target object on the multiple transmission resources may correspond, according to a mapping rule, to the multiple pieces of second spatial information included in the target spatial information, where the multiple transmission resources include at least one of the following: multiple transmission resources for time division multiplexing, multiple transmission resources for frequency division multiplexing, multiple transmission resources for space division multiplexing, or multiple transmission resources for code division multiplexing.

For example, if the target object is transmitted on different frequencies, first spatial information used for transmitting the target object on the different frequencies may correspond, according to a preset mapping rule, to the multiple pieces of second spatial information included in the target spatial information. For example, if the multiple pieces of second spatial information included in the target spatial information are spatial information 1 and spatial information 2, and the target object is transmitted on subcarrier group 1 and subcarrier group 2 that are orthogonal in frequency domain, it may be determined, according to the mapping rule, that first spatial information used for transmitting the target object on subcarrier group 1 corresponds to spatial information 1, and that first spatial information used for transmitting the target object on subcarrier group 2 corresponds to spatial information 2.

Alternatively, the target object may be transmitted multiple times on orthogonal time resources, and first spatial information used in each transmission corresponds, according to the preset mapping rule, to one of the multiple pieces of second spatial information included in the target spatial information. For example, the mapping rule is an alternate mapping rule. In this case, if the target spatial information includes two pieces of second spatial information: spatial information 1 and spatial information 2, mapping is performed in an alternate way: First spatial information used for the first transmission of the target object corresponds to spatial information 1, first spatial information used for the second transmission of the target object corresponds to spatial information 2, first spatial information used for the third transmission of the target object corresponds to spatial information 1, first spatial information used for the fourth transmission of the target object corresponds to spatial information 2, and so on. Alternatively, the mapping rule is that n consecutive repetitions correspond to a same piece of second spatial information. For example, n=2, and the target spatial information includes two pieces of second spatial information: spatial information 1 and spatial information 2. In this case, mapping is performed cyclically as follows: First spatial information used for the first transmission of the target object corresponds to spatial information 1, first spatial information used for the second transmission of the target object corresponds to spatial information 1, first spatial information used for the third transmission of the target object corresponds to spatial information 2, first spatial information used for the fourth transmission of the target object corresponds to spatial information 2, and so on.

For example, if the target object is transmitted on different spatial domain resources (for example, different layers of MIMO), first spatial information used for transmitting the target object in different spaces may correspond, according to a preset mapping rule, to the multiple pieces of second spatial information included in the target spatial information. For example, if the multiple pieces of second spatial information included in the target spatial information are spatial information 1 and spatial information 2, and the target object is transmitted on layer 1 and layer 2, it may be determined, according to the mapping rule, that first spatial information used for transmitting the target object on layer 1 corresponds to spatial information 1, and that first spatial information used for transmitting the target object on layer 2 corresponds to spatial information 2.

Alternatively, in another possible transmission scheme, the target object has one or more transmission resources, and the target spatial information is one of the multiple pieces of second spatial information. In other words, in the possible implementation, even if the target object has multiple transmission resources, first spatial information used for transmitting the target object on the transmission resources corresponds to a same piece of second spatial information, that is, the first spatial information used for transmitting the target object on the transmission resources is the same.

In the foregoing possible implementations, if a terminal transmitting the target object is configured with multiple first identifiers, the reference resource and the target object correspond to a same first identifier. For example, the first identifier may be a radio resource control (RRC) parameter: CORESETPoolIndex, which is generally used to identify a TRP. A network may configure for the terminal multiple CORESETs that are associated with different CORESET-PoolIndex values, so as to distinguish between TRPs to which the CORESETs respectively belong.

In a possible implementation, the reference resource and the target object may be in a same time unit. In other words, in this possible implementation, the first spatial information of the target object corresponds to second spatial information of a reference resource in the same time unit.

In the foregoing possible implementation, a time unit may be a slot, some orthogonal frequency division multiplexing (OFDM) symbols in a slot, multiple slots, or some OFDM symbols in multiple slots. This is not limited in this embodiment.

In a possible implementation, the target object may include any one of the following: an uplink channel, a downlink channel, an uplink signal, a downlink signal, and CORESET #0.

In a possible implementation, the reference resource includes any one of the following: a CORESET, a search space, a PDCCH for scheduling the target object, a physical uplink control channel (PUCCH), configured and/or activated spatial information, and a synchronization signal and PBCH block (SSB).

In a possible implementation, the first spatial information includes one of the following: a TCI state, QCL, and a spatial relationship.

In this embodiment of this disclosure, the first spatial information corresponding to the target spatial information may be the target spatial information. For example, in a case that the target spatial information is a TCI state, the first spatial information may be the TCI state. Alternatively, the first spatial information corresponding to the target spatial information may be spatial information having a corresponding relationship with the target spatial information. For example, in a case that the target spatial information is a TCI state or QCL, the first spatial information may be a spatial relationship corresponding to the TCI state or QCL.

S212: Transmit the target object based on determined first spatial information.

In this embodiment of this disclosure, transmitting the target object includes receiving the target object or sending the target object. For example, if the target object is a downlink channel (for example, a PDSCH), the communication device may be a network-side device or a terminal. For the network-side device, the downlink channel is sent based on the first spatial information corresponding to the target spatial information. For the terminal, the downlink channel is received based on the first spatial information corresponding to the target spatial information.

The following uses a terminal as an example to describe the technical solutions provided in the embodiments of this disclosure by using different target objects.

Embodiment 1

In this embodiment, the technical solutions provided in the embodiments of this disclosure are described by using an example in which the target object is a PDSCH.

In this embodiment, in a case that a PDCCH where DCI detected by UE is located corresponds to multiple TCI states, if the DCI does not indicate a TCI state of the PDSCH, for example, the detected DCI is DCI format 1_0 or is DCI format 1_1 or DCI format 1_2 that is not configured with tci-PresentInDCI, or if the detected DCI indicates a TCI state, but a symbol interval between the last OFDM symbol of the PDCCH where the DCI is located and the first OFDM symbol of a single-slot or multi-slot PDSCH scheduled by the PDCCH is less than a first threshold (for example, timeDurationForQCL), a TCI state or QCL of the PDSCH scheduled by the PDCCH is determined based on a TCI state or QCL corresponding to a reference resource (a pre-determined CORESET, namely, a CORESET associated with a monitored search space of a latest time unit).

A PDCCH in a multi-TRP scenario may be enhanced in the following manners: (1) A time-frequency resource of a PDCCH corresponds to different TCI states at a resource granularity according to a specified rule, and sending is performed in FDM or TDM mode. (2) Multiple transmissions of a PDCCH correspond to different TCI states, and sending is performed in SDM mode, FDM mode, TDM mode, or a combination thereof.

Therefore, that a PDCCH where DCI detected by UE is located corresponds to multiple TCI states includes but is not limited to the following cases (1) to (4).

(1) A PDCCH detected by the UE belongs to a first search space, or multiple transmissions of the PDCCH belong to a first search space, and the first search space is associated with a CORESET, where the CORESET corresponds to at least two TCI states.

(2) A PDCCH detected by the UE belongs to a second search space, or multiple transmissions of the PDCCH belong to a second search space, and the second search space is associated with at least two CORESETs, where each CORESET corresponds to one TCI state.

(3) Multiple transmissions of a PDCCH detected by the UE belong to different third search spaces (namely, one search space group), and all the third search spaces are associated with a same CORESET, where the CORESET corresponds to at least two TCI states.

(4) Multiple transmissions of a PDCCH detected by the UE belong to different fourth search spaces, and each fourth search space is associated with a corresponding CORESET, where each CORESET corresponds to one TCI state.

In this embodiment, in a case that the detected DCI does not indicate a TCI state or that the detected DCI indicates a TCI state, if a symbol interval offset1 between the last OFDM symbol of the PDCCH where the DCI is located and the first OFDM symbol of a single-slot or multi-slot PDSCH scheduled by the PDCCH is less than a first threshold timeDurationForQCL, spatial information (for example, a TCI state) of the PDSCH may be determined in the following manners (1) and (2) when multiple first identifiers (CORESETPoolIndex) are not configured and all activated TCI codepoints correspond to only one TCI state or QCL.

(1) If a CORESET associated with a monitored search space of a latest time unit (for example, a slot, a sub-slot, or multiple OFDM symbols (for example, SPANs) in one or more slots) corresponds to K different TCI states, the TCI state of the PDSCH is the same as M of the K different TCI states, where K is an integer greater than 1, and M is an integer greater than or equal to 1. For example, the TCI state is the same as the nth TCI state or the nth to (n+M−1)th TCI states among multiple different TCI states corresponding to the CORESET associated with the monitored search space of the latest time unit, where a value of n may be preset or agreed upon. Alternatively, the TCI state of the PDSCH is M TCI states having the highest signal strength among the K different TCI states.

(2) If the monitored search space of the latest time unit is associated with multiple CORESETs, the TCI state or QCL of the PDSCH corresponds to a TCI state corresponding to a CORESET that has the smallest identifier (ID) among the multiple CORESETs. Alternatively, the TCI state of the PDSCH is M TCI states that have the highest signal strength among the multiple TCI states corresponding to the multiple CORESETs, where M is an integer greater than or equal to 1. In the possible implementation, it may be preset or agreed that the CORESET having the smallest identifier is configured with M TCI states. For details, refer to Table 1. In this embodiment, the target object in Table 1 is a PDSCH.

In this embodiment, in a case that the detected DCI does not indicate any TCI state, if a symbol interval offset1 between the last OFDM symbol of the PDCCH where the DCI is located and the first OFDM symbol of a single-slot or multi-slot PDSCH scheduled by the PDCCH is greater than or equal to a first threshold timeDurationForQCL, a TCI state of the PDSCH may be determined in one of the following manners (1) and (2) when multiple first identifiers (CORESETPoolIndex) are not configured and all activated TCI codepoints correspond to only one TCI state or QCL.

(1) If it is detected that a time-frequency resource of the PDCCH where the detected DCI is located corresponds to different pieces of spatial information at a resource granularity according to a specified rule, and that sending is performed in FDM or TDM mode, it is determined that spatial information of a PDSCH in one or multiple transmissions is one of multiple pieces of spatial information corresponding to the PDCCH (that is, the PDCCH is a reference resource of the PDSCH). In other words, a TCI state of the PDSCH for each transmission corresponds to one of the TCI states or QCLs of the PDCCH. Alternatively, for the PDSCH transmitted in multiple times, it is determined that spatial information of the PDSCH for each transmission corresponds, according to a pre-determined rule, to one of multiple pieces of spatial information corresponding to the PDCCH. For example, the transmissions correspond to the multiple pieces of spatial information alternately, or n consecutive transmissions correspond to same spatial information. For example, if the PDCCH corresponds to TCI state 1 and TCI state 2 at a resource granularity according to a specified rule, spatial information for multiple transmissions of the PDSCH corresponds to the TCI states alternatively: Spatial information for the first transmission corresponds to TCI state 1, spatial information for the second transmission corresponds to TCI state 2, spatial information for the third transmission corresponds to TCI state 1, and so on.

(2) If it is detected that the multiple transmissions of the PDCCH where the detected DCI is located correspond to different pieces of spatial information, and that sending is performed in SDM mode, FDM mode, TDM mode, or a combination thereof, it is determined that spatial information of a PDSCH transmitted in one or multiple times corresponds to spatial information of the PDCCH for one of the multiple transmissions, for example, corresponds to spatial information of the PDCCH for the first, the nth, or the last transmission. Alternatively, if the PDSCH is transmitted in multiple times, it is determined that spatial information of the PDSCH in each transmission corresponds, according to a pre-determined rule, to one of the multiple pieces of spatial information of the PDCCH for the multiple transmissions. For example, corresponding is performed alternatively. For example, if a TCI state of the PDCCH for the first transmission is TCI state 1, and a TCI state for the second transmission is TCI state 2, spatial information of the PDSCH transmitted in multiple times correspond to the TCI states alternately: Spatial information for the first transmission corresponds to TCI state 1, spatial information for the second transmission corresponds to TCI state 2, spatial information for the third transmission corresponds to TCI state 1, and so on. For details, refer to Table 1.

TABLE 1

| DCI format | tci-PresentIn DCI | Quantity of TCI states indicated by TCI codepoint | Offset1 < timeDurationForQCL | Offset1 ≥ timeDurationForQCL |
|---|---|---|---|---|
| 1_1/1_2 | Not enabled | — | Manner 1-1-1: If the CORESET associated with the monitored search space of the latest time unit corresponds to multiple different TCI states, a TCI state or QCL of the target object corresponds to one of the TCI states. Manner 2-1-1: If the CORESET associated with the monitored search space of the latest time unit corresponds to one TCI state, a TCI state or QCL of the target object corresponds to the TCI state. Manner 2-1-2: If the monitored search space of the latest time unit is associated with multiple CORESETs, a TCI state or QCL of the target object corresponds to a TCI state corresponding to a CORESET that has the smallest ID among the multiple CORESETs, or corresponds to a TCI state that corresponds to a relatively strong signal among multiple TCI states corresponding to the multiple CORESETs. | Manner 1-2-1: A single or multiple transmissions of the PDSCH correspond to one of the TCI states or QCLs of the PDCCH. Manner 1-2-2: Multiple transmissions of the PDSCH respectively correspond, according to a specified rule, to the multiple TCI states or QCLs of the PDCCH. Manner 2-2-1: A single or multiple transmissions of the PDSCH correspond to one of the multiple TCI states or QCLs of the PDCCH for a corresponding transmission. Manner 2-2-2: Each of multiple transmissions of the PDSCH corresponds, according to a specified rule, to one of the multiple TCI states or QCLs of the PDCCH for a corresponding transmission. |
| 1_0 | — | | | |
| 1_1/1_2 | Enabled | 1 | | Single PDSCH transmission: performed according to a TCI state indicated by a TCI field of DCI. Multiple PDSCH transmissions: all performed according to a TCI state indicated by the TCI field. |

In a multi-TRP scenario, control signaling may come from multiple TRPs, which is called multi-DCI based multi-TRP. That is, each TRP sends its own PDCCH, and each PDCCH schedules its own PDSCH, AP CSI-RS, PUSCH, or SRS. Multiple CORESETs configured for UE are associated with different RRC parameters CORESETPoolIndex, and correspond to different TRPs.

first identifiers. A difference lies in that a TCI state or QCL of the PDSCH corresponds to one or more TCI states corresponding to a CORESET that belongs to a same CORESETPoolIndex as the PDSCH and that is associated with the monitored search space of the latest time unit. As shown in Table 2, in this embodiment, the target object in Table 2 is a PDSCH.

TABLE 2

| DCI format | tci-PresentInDCI | Quantity of TCI states of TCI codepoint | Offset1 < timeDurationForQCL | Offset1 ≥ timeDurationForQCL |
|---|---|---|---|---|
| 1_1/1_2 | Not enabled | — | Manner 1-1-1: The CORESET is a CORESET that has a same first identifier as the target object. Manner 2-1-1: The CORESET is a CORESET that has a same first identifier as the target object. Manner 2-1-2: The CORESET is a CORESET that has a same first identifier as the target object. | Manner 1-2-1 Manner 1-2-2 Manner 2-2-1 Manner 2-2-2 |
| 1_0 | — | | | |
| 1_1/1_2 | Enabled | 1 | | Single PDSCH transmission: performed according to a TCI state indicated by a TCI field of DCI. Multiple PDSCH transmissions: all performed according to a TCI state indicated by the TCI field. |

In this embodiment, in a case that the detected DCI does not indicate any TCI state or that the detected DCI indicates a TCI state, if a symbol interval offset1 between the last OFDM symbol of the PDCCH where the DCI is located and the first OFDM symbol of a single-slot or multi-slot PDSCH scheduled by the PDCCH is less than a first threshold timeDurationForQCL, spatial information of the PDSCH in a case of UE being configured with multiple first identifiers (CORESETPoolIndex) and all activated TCI codepoints being corresponding to only one TCI state or QCL is similar to that in a case of the UE not being configured with multiple In a multi-TRP scenario, control signaling may alternatively come from one TRP, which is called single-DCI based multi-TRP, that is, one TRP sends a PDCCH to schedule one PDSCH. The PDSCH includes various multi-TRP transmission schemes: Data on different layers of the PDSCH comes from different TRPs; or data on subcarriers in different frequency domains comes from different TRPs; or each time domain repetition comes from a different TRP. In this case, a MAC CE activates up to eight TCI codepoints, where at least one TCI codepoint corresponds to two TCI states. When a TCI codepoint indicated by a TCI field in detected DCI corresponds to two TCI states and indicates that one of the TCI states contains "QCL-TypeD" (namely, QCL of a spatial beam type), the TCI codepoint indicates scheduling for the PDSCH transmitted using multiple TRPs. A transmission scheme is determined in another manner, for example, configured using a higher-layer parameter. If the time offset offset1 is less than timeDurationForQCL, the UE may use multiple default reception beams to receive the PDSCH, that is, the UE may consider that a DMRS port of a PDSCH of a serving cell is QCLed with an RS in two TCI states indicated by a codepoint that has the smallest index among codepoints containing two different TCI states. As shown in Table 3, at least one activated TCI codepoint corresponds to two TCI states (single-DCI based MTRP).

TABLE 3

| DCI format | tci-PresentInDCI | Quantity of TCI states of TCI codepoint | Offset1 < timeDurationForQCL | Offset1 ≥ timeDurationForQCL |
|---|---|---|---|---|
| 1_1/1_2<br>1_0 | Not enabled<br>— | — | A PDSCH uses two TCI states corresponding to the smallest codepoint among codepoints containing two TCI states. | Manner 1-2-1<br>Manner 1-2-2<br>Manner 2-2-1<br>Manner 2-2-2 |
| 1_1/1_2 | Enabled | 1 | A PDSCH uses two TCI states corresponding to the smallest codepoint among codepoints containing two TCI states. | Single PDSCH transmission: performed according to a TCI state indicated by a TCI field of DCI.<br>Multiple-PDSCH-transmission/single-TCI scheme 4: performed according to a TCI field of DCI corresponding to a TCI state activated in the first PDSCH transmission. |
| 1_1/1_2 | Enabled | 2 | PDSCH uses two TCI states corresponding to the smallest codepoint among codepoints containing two TCI states.<br>Scheme 1a/2a/2b: Receiving is performed according to two default TCI states.<br>Scheme 3/4: If the first PDSCH < timeDurationForQCL, two default TCIs are used in a determined order. | A PDSCH is received according to a corresponding scheme rule and two TCI states indicated by DCI. |

In addition, the target object may alternatively be a cross-carrier scheduled PDSCH. If a PDCCH for transmitting scheduling DCI is on a first CC, a PDSCH scheduled by the DCI is on a second CC (where the first CC and the second CC are different), and UE is configured with enableDefaultBeamForCCS, the foregoing Offset1 is currently less than timeDurationForQCL+Δ1, where Δ1 is a time adjustment value for different subcarrier spacings of the two CCs. In a case that the DCI does not include any TCI field, if there are multiple TCI states activated for the PDSCH on an activated BWP of the second CC, QCL for receiving a PDSCH by the UE may correspond to one of the multiple TCI states, for example, the first TCI state; or QCL for receiving a PDSCH by the UE corresponds to a TCI state having the strongest signal among the multiple TCI states. In this embodiment, the reference resource is multiple pieces of activated spatial information, and is multiple TCI states used for a PDSCH.

Embodiment 2

In this embodiment, the technical solutions provided in the embodiments of this disclosure are described by using an example in which the target object is a channel state information (CSI) reference signal (RS).

In a case that a parameter repetition is not configured to be "on" in the CSI-RS, if UE is configured with a CSI-RS resource, and the CSI-RS resource is in one or more same OFDM symbols as a search space associated with a CORESET, spatial information of the CSI-RS may be determined based on the CORESET (namely, a reference resource). If the CORESET corresponds to multiple TCI states or QCLs, the UE may assume that the CSI-RS is in QCL-TypeD with one of the multiple TCI states or QCLs that correspond to a DMRS of a PDCCH in all search space sets associated with the CORESET. If the QCL-TypeD is available, for example, the CSI-RS corresponds to a first TCI state or QCL, or one or more TCI states or QCLs that have the highest signal strength among the multiple TCI states or QCLs corresponding to the CORESET, the UE may determine that the spatial information of the CSI-RS corresponds to one or more TCI states or QCLs corresponding to the CORESET, where the one or more TCI states or QCLs may be pre-designated, for example, the first TCI state or QCL; or may be one or more TCI states or QCLs that have the highest signal strength among the multiple TCI states or QCLs corresponding to the CORESET.

The technical solution provided in this embodiment is also applicable when a CSI-RS and a CORESET are located on different intra-band carriers.

Embodiment 3

In this embodiment, the technical solutions provided in the embodiments of this disclosure are described by using an example in which the target object is an aperiodic CSI-RS (A-CSI-RS) associated with a CSI triggered state indicated by DCI.

In this embodiment, a CSI triggered state indicated by DCI detected by UE is associated with an A-CSI-RS, where a BWP where the A-CSI-RS is located is configured with at least one CORESET.

In this embodiment, if a scheduling offset of the A-CSI-RS is less than a second preset value, spatial information of the A-CSI-RS is determined based on a CORESET configured for a BWP where the A-CSI-RS is located, where the scheduling offset is a quantity of symbols between the last symbol of a PDCCH transmitting the DCI and the first symbol of an A-CSI-RS resource not configured with transmission information (trs-Info) in CSI-RS resource set configuration parameters.

In this embodiment, in a case that the UE is not configured with multiple values of CORESETPoolIndex (namely, the first identifier) and that all activated TCI codepoints correspond to only one TCI state, if the A-CSI-RS does not have a same OFDM symbol as another downlink signal, and a BWP where the A-CSI-RS is located is configured with at least one CORESET, the spatial information of the A-CSI-RS may be determined in manner 1-1-1, 2-1-1, or 2-1-2 in Table 1 when the scheduling offset offset2 is less than the second preset value (namely, threshold 2). Details are shown in Table 4.

If UE:

(1) has reported beamCorrespondence WithoutUL-BeamSweeping, (2) is not configured with pathlossReferenceRSs in PUCCH-PowerControl, (3) is configured with enableDefaultBeamPlForPUCCH, and (4) is not configured with PUCCH-SpatialRelationInfo, spatial information (a spatial relationship) used by the UE for sending a PUCCH is determined based on spatial information corresponding to a reference resource, where the reference resource includes a first target CORESET, and the first target CORESET is a CORESET having the smallest identifier on an activated downlink BWP of a cell sending the PUCCH.

In this embodiment, the determining that the first spatial information of the target object corresponds to target spatial information may include one of the following steps:

TABLE 4

| | Offset2 < threshold 2 | Offset2 ≥ threshold 2 |
|---|---|---|
| If the A-CSI-RS has a same symbol as another downlink signal | The A-CSI-RS uses QCL of the another downlink signal. | The A-CSI-RS uses QCL of an A-CSI-RS resource associated with a CSI triggered state indicated by DCI. |
| Otherwise, if a BWP where a triggered A-CSI-RS is located is configured with at least one CORESET | Manner 1-1-1<br>Manner 2-1-1<br>Manner 2-1-2 | |
| Otherwise, if UE is configured with an enableDefaultBeamForCCS parameter [enableDefaultBeamForCCS] | The A-CSI-RS uses a TCI state that has the smallest ID among activated TCI states available for a PDSCH on an active downlink BWP for the CC or cell. | |

The another downlink signal includes: a PDSCH with a scheduling offset greater than or equal to timeDurationForQCL, a periodic CSI-RS (P-CSI-RS), a semi-persistent CSI-RS (SP-CSI-RS), and an AP-CSI-RS with a scheduling offset greater than or equal to threshold 2.

When the UE reports that a threshold beamSwitchTiming is one of {14, 28, 48} and a network is not configured with enableBeamSwitchTiming-r16, threshold 2 is the threshold beamSwitch Timing reported by the UE; or when the UE reports that a threshold beamSwitch Timing is one of {224, 336} and a network is not configured with enableBeamSwitchTiming-r16, threshold 2 is 48. If a PDCCH that triggers the A-CSI-RS has a different subcarrier spacing from the A-CSI-RS (for example, a case that may occur in cross-carrier scheduling), threshold 2 is beamSwitchTiming+Δ2 (Δ2 is a time adjustment value for different subcarrier spacings).

However, in a case that the UE is configured with multiple values of CORESETPoolIndex (namely, the first identifier) and uses multi-DCI based MTRP, in this embodiment, if the A-CSI-RS does not have any same OFDM symbol as another downlink signal, and a BWP where the A-CSI-RS is located is configured with at least one CORESET, the spatial information of the A-CSI-RS may be determined in manner 1-1-1, 2-1-1, or 2-1-2 in Table 1 when the scheduling offset offset2 is less than the second preset value (that is, threshold 2), where the CORESET in Table 1 is a CORESET that corresponds to a same first identifier as the target object (the A-CSI-RS in this embodiment).

Embodiment 4

In this embodiment, the technical solutions provided in the embodiments of this disclosure are described by using an example in which the target object is a PUCCH.

(1) Determine that first spatial information of a PUCCH transmitted in one or multiple times corresponds to the target spatial information. For example, for single PUCCH sending or multiple PUCCH sending, a spatial relationship for sending the PUCCH corresponds to one of the multiple TCI states or QCLs corresponding to the foregoing CORESET, for example, the first TCI state, or a TCI state that corresponds to a relatively strong signal among the multiple TCI states.

(2) If the PUCCH is transmitted in multiple times, determine that first spatial information of the PUCCH for each transmission corresponds, according to a pre-determined rule, to one of multiple pieces of spatial information corresponding to the first target CORESET. For example, for multiple repetitions of the PUCCH, a spatial relationship of the PUCCH for each sending corresponds, according to a rule, to one of the multiple TCI states or QCLs corresponding to the foregoing CORESET, for example, in an alternate way.

Embodiment 5

In this embodiment, the technical solutions provided in the embodiments of this disclosure are described by using an example in which the target object is a PUSCH.

In a possible implementation of this embodiment, if detected DCI is DCI format 0_0, because uplink scheduling DCI format 0_0 has no spatial relationship indications (SRI) for PUSCH sending, a spatial relationship of a PUSCH scheduled by DCI format 0_0 is determined based on spatial information corresponding to a target PUCCH resource (namely, a reference resource of the PUSCH) on an activated uplink BWP of a cell transmitting the PUSCH, where the target PUCCH resource is a PUCCH resource that has the smallest identifier on the activated uplink BWP of the cell.

In this case, the determining that the first spatial information of the target object corresponds to target spatial information may include any one of the following:

(1) Determine that first spatial information of a PUSCH transmitted in one or multiple times corresponds to one of multiple pieces of second spatial information corresponding to the target PUCCH resource, and that a spatial relationship for sending a PUSCH in one or multiple times corresponds to one of multiple spatial relationships of the target PUCCH resource, for example, the first spatial relationship or a pre-configured spatial relationship.

(2) For the PUSCH transmitted in multiple times, determine that first spatial information of the PUSCH for each transmission corresponds, according to a pre-determined rule, to one of multiple pieces of second spatial information corresponding to the target PUCCH resource. For example, if the PUSCH is sent in multiple times, a spatial relationship for each transmission opportunity of the PUSCH corresponds to one of multiple spatial relationships of the PUCCH resource according to a rule, for example, in an alternate way.

In another possible implementation of this embodiment, if a higher-layer parameter enableDefaultBeamPlForPUSCH0_0 of UE in an RRC connected state is set to "enabled", and no PUCCH resources are configured on an activated uplink BWP, or none of the PUCCH resources configured on the activated uplink BWP are configured with a spatial relationship, the reference resource of the PUSCH includes a second target CORESET, where the second target CORESET is a CORESET having the smallest identifier on an activated downlink BWP of a CC or cell sending the PUSCH. If the CORESET having the smallest identifier corresponds to multiple TCI states, the determining that the first spatial information of the target object corresponds to target spatial information includes any one of the following:

(1) Determine that first spatial information of a PUSCH transmitted in one or multiple times corresponds to the target spatial information. For example, for single PUSCH sending or multiple PUSCH sending, a spatial relationship for sending the PUSCH corresponds to one TCI state or QCL of the multiple TCI states or QCLs corresponding to the second target CORESET, for example, the first TCI state, or a TCI state that corresponds to a relatively strong signal among the multiple TCI states.

(2) For the PUSCH transmitted in multiple times, determine that first spatial information of the PUSCH for each transmission corresponds, according to a pre-determined rule, to one of multiple pieces of spatial information corresponding to the second target CORESET. For example, for multiple repetitions of the PUSCH, a spatial relationship for each sending of the PUSCH corresponds, according to a rule, to one TCI state or QCL of the multiple TCI states or QCLs corresponding to the second target CORESET, for example, in an alternate way.

Embodiment 6

In this embodiment, the technical solutions provided in the embodiments of this disclosure are described by using an example in which the target object is a sounding reference signal (SRS).

When UE satisfies the following conditions:

(1) a higher-layer parameter enableDefaultBeamPlForSRS is set to "enabled", (2) FR2 is not configured with a higher-layer parameter spatialRelationInfo, except that a parameter usage in SRS-ResourceSet is set to "beamManagement" or {set to "nonCodebook" and configured with associatedCSI-RS} or an SRS resource is configured with SRS-PosResourceSet-r16, (3) CORESETPoolIndex having multiple different values is not configured (not multi-DCI based MTRP), and (4) a TCI codebook containing two corresponding TCI states is not configured (not single-DCI based MTRP), a spatial relationship of the SRS is determined based on a CORESET (namely, a third target CORESET) having the smallest identifier on an activated uplink BWP of a carrier or cell transmitting the SRS. If a third target CORESET corresponds to multiple TCI states or QCLs, the determining that the first spatial information of the target object corresponds to target spatial information may include any one of the following:

(1) A spatial relationship for sending one SRS resource, a spatial relationship for sending one SRS resource repeatedly, or a spatial relationship for sending multiple SRS resources corresponds to a reference signal (RS) having "QCL-TypeD". If QCL-TypeD is available, the RS corresponds to one of the multiple TCI states or QCLs corresponding to the third target CORESET, for example, the first TCI state, or a TCI state that corresponds to a strongest signal among the multiple TCI states.

(2) A spatial relationship for each of the repetitions of one SRS resource or a spatial relationship for sending each of the multiple SRS resources corresponds to an RS having "QCL-TypeD" according to a rule. If QCL-TypeD is available, each RS corresponds, according to a rule, to one of the multiple TCI states or QCLs corresponding to the third target CORESET, for example, in an alternate way.

Embodiment 7

In this embodiment, the technical solutions provided in the embodiments of this disclosure are described by using an example in which the target object is CORESET #0.

Among CORESETs, CORESET #0 may have a different characteristic from other CORESETs. For example, CORESET #0 may be provided by a master information block (MIB) sent on a physical broadcast channel (PBCH) as a part of the initial bandwidth part (BWP) setting. CORESET #0 may be a CORESET used for monitoring a physical downlink control channel (PDCCH) used for scheduling a physical downlink shared channel (PDSCH) carrying a system information block (SIB1), and may be used to receive other system information and additional setting information. In addition, another CORESET may be provided through dedicated RRC signaling, and that CORESET may be used to receive particular UE control information. Moreover, CORESET #0 may have no explicit setting for a TCI state. Therefore, it is necessary to determine spatial information of CORESET #0. Since a TCI state of CORESET #0 is related to a reference signal associated with a synchronization signal/physical broadcast channel block (SSB, also called a synchronization signal and PBCH block), the TCI state of CORESET #0 is determined based on spatial information corresponding to the SSB (namely, a reference resource).

When a search space (namely, SS #0) of CORESET #0 is configured with multiple pieces of spatial information, for example, SS #0 is configured with multiple tracking reference signals (TRS), each TRS is associated with one SSB, different TRSs are associated with different SSBs, and different SSBs are configured with different pieces of spatial information. In this case, a reference resource (namely, an SSB) of CORESET #0 corresponds to multiple pieces of spatial information. In this embodiment, if it is determined that the spatial information (for example, a TCI state or QCL) of CORESET #0 corresponds to spatial information of one of the SSBs, for example, a pre-designated SSB, when the SSB has been detected, the UE may determine, based on spatial information (namely, a reception beam) of the SSB, that the spatial information of CORESET #0 corresponds to the spatial information of the SSB.

It should be noted that although the foregoing embodiments are described by using a terminal as an example, the embodiments are not limited thereto. A network-side device may determine first spatial information of a target object and transmit the target object based on the first spatial information, in a same way as the terminal does. Details are not described in this embodiment of this disclosure.

Figure 3:
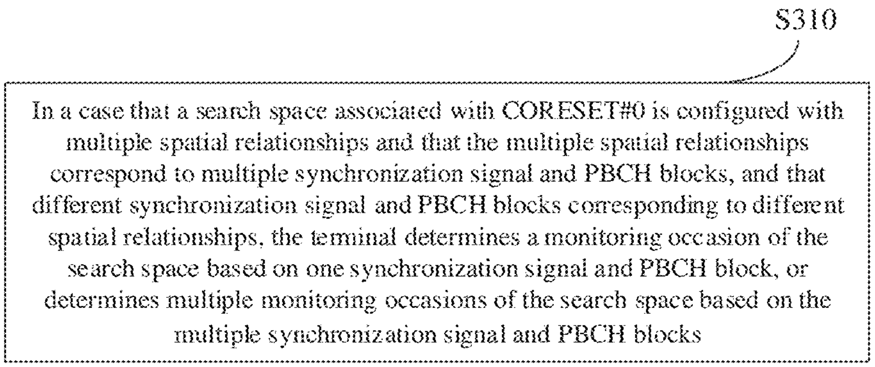
FIG. 3 is a schematic flowchart of a method for determining a monitoring occasion according to an embodiment of this disclosure.

FIG. 3 is a schematic flowchart of a method for determining a monitoring occasion according to an embodiment of this disclosure. The method may be performed by a terminal. In other words, the method may be performed by software or hardware installed on the terminal. As shown in FIG. 3, the method may include the following step.

S310: In a case that a search space associated with CORESET #0 is configured with multiple spatial relationships and that the multiple spatial relationships correspond to multiple synchronization signal and PBCH blocks, and that different synchronization signal and PBCH blocks corresponding to different spatial relationships, the terminal determines a monitoring occasion of the search space based on one synchronization signal and PBCH block, or determines multiple monitoring occasions of the search space based on the multiple synchronization signal and PBCH blocks.

For example, when one synchronization signal and PBCH block is detected, the terminal may determine a monitoring occasion of the search space of CORESET #0 based on the detected synchronization signal and PBCH block, and monitors CORESET #0 on the corresponding monitoring occasion. Alternatively, the terminal may determine multiple monitoring occasions of the search space of the CORESET #0 based on multiple detected SSBs.

In a possible implementation, that the terminal determines a monitoring occasion of the search space based on the synchronization signal and PBCH block includes: determining a time-frequency resource and a spatial relationship for the monitoring occasion of the search space based on the one synchronization signal and PBCH block; and the determining the multiple monitoring occasions of the search space based on the multiple synchronization signal and PBCH blocks includes: determining time-frequency resources and spatial relationships for the multiple monitoring occasions of the search space based on the multiple synchronization signal and PBCH blocks. In other words, in the possible implementation, the determining a monitoring occasion of the search space includes: determining a time-frequency resource and a spatial relationship for the monitoring occasion.

For a non-broadcast PDCCH, when in connected mode, a network-side device and UE have a same understanding of SSB/CORESET #0/SS #0. Therefore, in this embodiment, a monitoring occasion of SS #0 of CORESET #0 can be determined based on a detected SSB. In a case that multiple SSBs are configured, one monitoring occasion may be determined based on one of the SSBs, or multiple monitoring occasions may be determined based on the multiple SSBs.

According to the method for determining a monitoring occasion provided in this embodiment of this disclosure, in a case that a search space associated with CORESET #0 is configured with multiple spatial relationships and that the multiple spatial relationships correspond to multiple synchronization signal and PBCH blocks, and that different synchronization signal and PBCH blocks corresponding to different spatial relationships, a monitoring occasion of the search space may be determined based on one synchronization signal and PBCH block, or multiple monitoring occasions of the search space may be determined based on the multiple synchronization signal and PBCH blocks.

It should be noted that the transmission method provided in the embodiments of this disclosure may be performed by a transmission apparatus or a control module included in the transmission apparatus and configured to execute the transmission method. In the embodiments of this disclosure, the transmission method being performed by a transmission apparatus is used as an example to describe the transmission apparatus provided in the embodiments of this disclosure.

Figure 4:
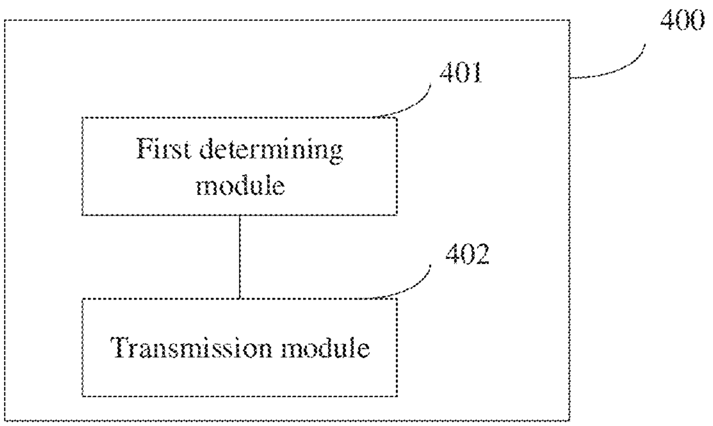
FIG. 4 is a schematic structural diagram of a transmission apparatus according to an embodiment of this disclosure.

FIG. 4 is a schematic structural diagram of a transmission apparatus according to an embodiment of this disclosure. As shown in FIG. 4, the transmission apparatus 400 may include a first determining module 401 and a transmission module 402.

In this embodiment of this disclosure, the first determining module 401 is configured to: in a case that first spatial information of a target object is determined based on second spatial information corresponding to a reference resource, determine that the first spatial information of the target object corresponds to target spatial information, where the reference resource corresponds to multiple pieces of second spatial information, and the target spatial information is one or more of the multiple pieces of second spatial information; and the transmission module 402 is configured to transmit the target object based on determined first spatial information.

In a possible implementation, the target spatial information is one or more pieces of second spatial information having highest signal strength among the multiple pieces of second spatial information; or the target spatial information is one or more pieces of pre-designated second spatial information among the multiple pieces of second spatial information.

In a possible implementation, the reference resource includes multiple reference sub-resources; and the target spatial information is second spatial information corresponding to one or more preset reference sub-resources among the multiple reference sub-resources; or the target spatial information is one or more pieces of second spatial information having highest signal strength among multiple pieces of second spatial information corresponding to the multiple reference sub-resources.

In a possible implementation, a quantity of second spatial information corresponding to a preset reference sub-resource is preset to or agreed to be one or more.

In a possible implementation, the target object has multiple transmission resources, and first spatial information used for transmitting the target object on the multiple transmission resources corresponds, according to a mapping rule, to the multiple pieces of second spatial information included in the target spatial information, where the multiple transmission resources include at least one of the following: multiple transmission resources for time division multiplexing, multiple transmission resources for frequency division multiplexing, multiple transmission resources for space division multiplexing, or multiple transmission resources for code division multiplexing.

In a possible implementation, the target object has one or more transmission resources, and the target spatial information is one of the multiple pieces of second spatial information.

In a possible implementation, if a terminal transmitting the target object is configured with multiple first identifiers, the reference resource and the target object correspond to a same first identifier.

In a possible implementation, the reference resource and the target object are in a same time unit.

In a possible implementation, one time unit includes any one of the following: one slot, multiple slots, some OFDM symbols in one slot, and some OFDM symbols in multiple slots.

In a possible implementation, the target object includes any one of the following: an uplink channel, a downlink channel, an uplink signal, a downlink signal, and a control resource set CORESET #0.

In a possible implementation, the reference resource includes any one of the following: a CORESET, a search space, a PDCCH for scheduling the target object, a PUCCH, configured and/or activated spatial information, and an SSB.

In a possible implementation, the spatial information includes one of the following: a transmission configuration indication (TCI) state, quasi co-location (QCL), and a spatial relationship.

The transmission apparatus in this embodiment of this disclosure may be an apparatus, or may be a component, an integrated circuit, or a chip in a communication device. The apparatus may be a network-side device or a terminal. The terminal may be a mobile terminal or a non-mobile terminal. For example, the mobile terminal may include but is not limited to the types of the terminal 11 listed above; and the non-mobile terminal may be a server, a network attached storage (NAS), a personal computer (PC), a television (TV), an automated teller machine, a self-service machine, or the like. This is not limited in this embodiment of this disclosure.

The transmission apparatus in this embodiment of this disclosure may be an apparatus having an operating system. The operating system may be an Android operating system, an iOS operating system, or another possible operating system, which is not limited in the embodiments of this disclosure.

The transmission apparatus provided in this embodiment of this disclosure can implement the processes implemented in the method embodiment in FIG. 2, with the same technical effects achieved. To avoid repetition, details are not described herein again.

It should be noted that, the method for determining a monitoring occasion provided in the embodiments of this disclosure may be performed by an apparatus for determining a monitoring occasion, or a control module that is in the apparatus for determining a monitoring occasion and that is configured to perform the method for determining a monitoring occasion. In the embodiments of this disclosure, the method for determining a monitoring occasion being performed by an apparatus for determining a monitoring occasion is used as an example to describe the apparatus for determining a monitoring occasion provided in the embodiments of this disclosure.

Figure 5:
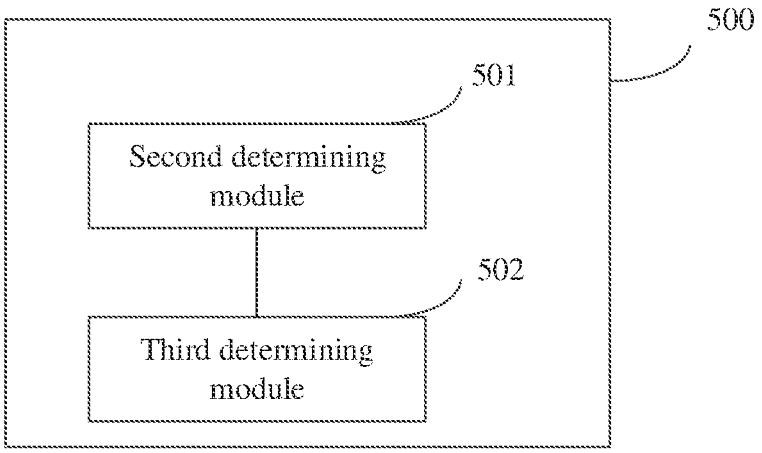
FIG. 5 is a schematic structural diagram of an apparatus for determining a monitoring occasion according to an embodiment of this disclosure.

FIG. 5 is a schematic structural diagram of an apparatus for determining a monitoring occasion according to an embodiment of this disclosure. As shown in FIG. 5, the apparatus 500 for determining a monitoring occasion may include a second determining module 501 and a third determining module 502.

In this embodiment of this disclosure, the second determining module 501 is configured to determine that a search space associated with CORESET #0 is configured with multiple spatial relationships, where the multiple spatial relationships correspond to multiple synchronization signal and PBCH blocks, and that different synchronization signal and PBCH blocks correspond to different spatial relationships; and the third determining module 502 is configured to determine a monitoring occasion of the search space based on one synchronization signal and PBCH block, or determine multiple monitoring occasions of the search space based on the multiple synchronization signal and PBCH blocks.

In a possible implementation, the third determining module 502 is configured to: determine a time-frequency resource and a spatial relationship of the monitoring occasion based on the one synchronization signal and PBCH block; or determine time-frequency resources and spatial relationships of the multiple monitoring occasions based on the multiple synchronization signal and PBCH blocks.

The apparatus for determining a monitoring occasion in this embodiment of this disclosure may be an apparatus, or may be a component, an integrated circuit, or a chip in a terminal. The apparatus may be a mobile terminal or a non-mobile terminal. For example, the mobile terminal may include but is not limited to the types of the terminal 11 listed above; and the non-mobile terminal may be a server, a network attached storage (NAS), a personal computer (PC), a television (TV), an automated teller machine, a self-service machine, or the like. This is not specifically limited in the embodiments of this disclosure.

The transmission apparatus in this embodiment of this disclosure may be an apparatus having an operating system. The operating system may be an Android operating system, an iOS operating system, or another possible operating system, which is not limited in the embodiments of this disclosure.

The transmission apparatus provided in this embodiment of this disclosure can implement the processes implemented in the method embodiment in FIG. 3, with the same technical effects achieved. To avoid repetition, details are not described herein again.

Figure 6:
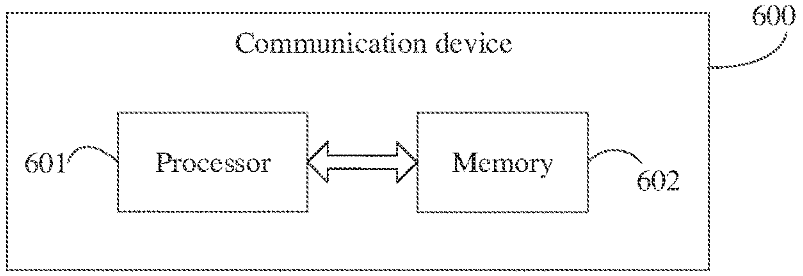
FIG. 6 is a schematic structural diagram of a communication device according to an embodiment of this disclosure.

Optionally, as shown in FIG. 6, an embodiment of this disclosure further provides a communication device 600, including a processor 601, a memory 602, and a program or instructions stored in the memory 602 and capable of running on the processor 601. For example, when the communication device 600 is a terminal, the program or instructions are executed by the processor 601 to implement the processes in the foregoing embodiments of the transmission method or the method for determining a monitoring occasion, with the same technical effects achieved. When the communication device 600 is a network-side device, the program or instructions are executed by the processor 601 to implement the processes in the foregoing embodiments of the transmission method, with the same technical effects achieved. To avoid repetition, details are not described herein again.

Figure 7:
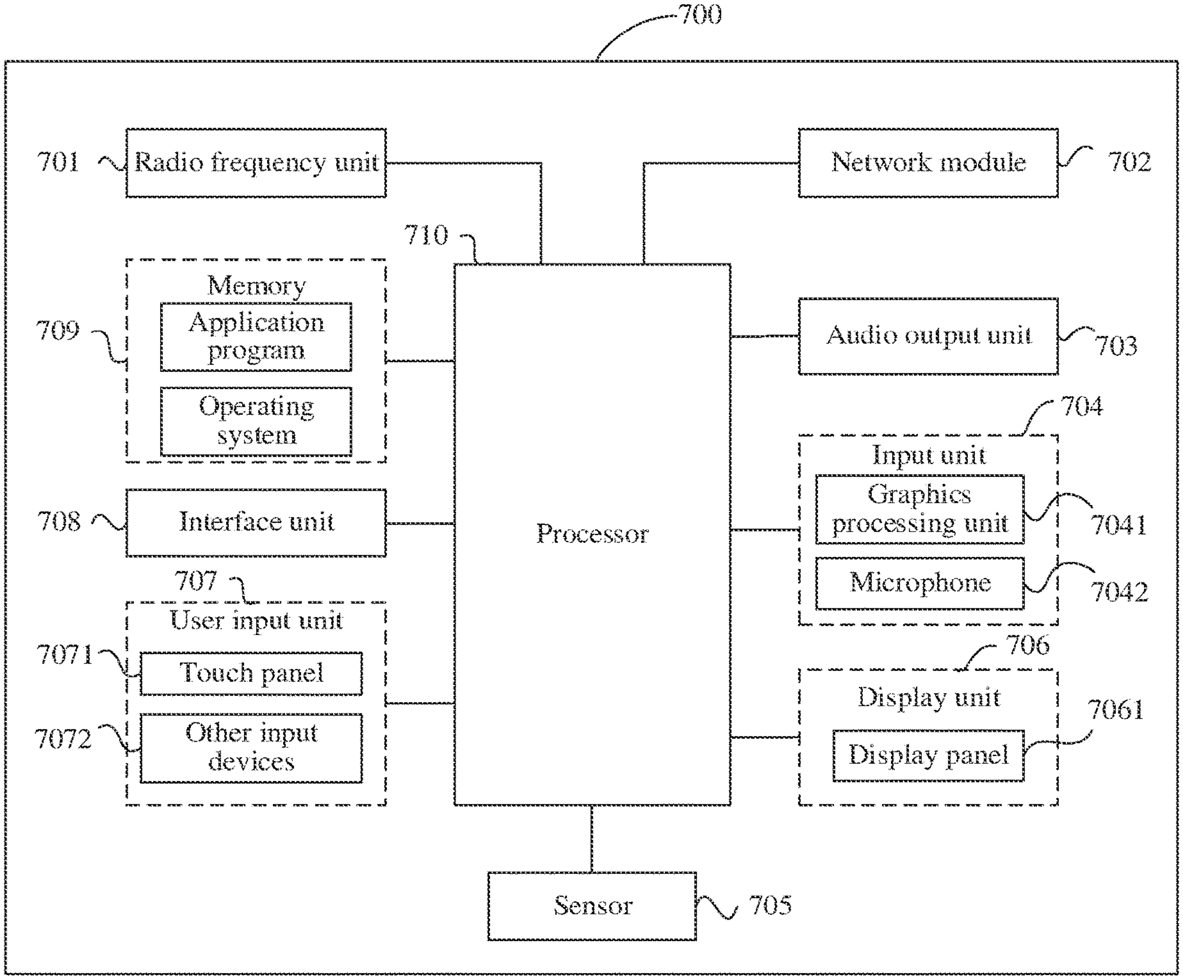
FIG. 7 is a schematic structural diagram of hardware of a terminal according to an embodiment of this disclosure.

FIG. 7 is a schematic structural diagram of hardware of a terminal according to an embodiment of this disclosure.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (for example, a battery) supplying power to the components. The power supply may be logically connected to the processor 710 through a power management system. In this way, functions such as charge management, discharge management, and power consumption management are implemented through the power management system. The structure of the terminal shown in FIG. 7 does not constitute any limitation on the terminal. The terminal may include more or fewer components than shown in the figure, or combine some components, or have different arrangements of components. Details are not further described herein.

It should be understood that in this embodiment of this disclosure, the input unit 704 may include a graphics processing unit (GPU) 7041 and a microphone 7042. The graphics processing unit 7041 processes image data of a static image or a video obtained by an image capture apparatus (for example, a camera) in a video capture mode or an image capture mode. The display unit 706 may include a display panel 7061. The display panel 7061 may be configured in a form of a liquid crystal display, organic light-emitting diodes, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function button (for example, a volume control button or a power on/off button), a trackball, a mouse, and a joystick. Details are not described herein.

In this embodiment of this disclosure, the radio frequency unit 701 receives downlink data from a network-side device and sends the downlink data to the processor 710 for processing; and in addition, sends uplink data to the network-side device. Generally, the radio frequency unit 701 includes but is not limited to an antenna, at least one amplifier, a transceiver, a coupler, a low noise amplifier, a duplexer, or the like.

The memory 709 may be configured to store software programs or instructions and various data. The memory 709 may mainly include a program/instruction storage area and a data storage area. The program/instruction storage area may store an operating system, an application program or instructions required by at least one function (for example, a sound playback function or an image display function), or the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 710 may include one or more processing units. Optionally, an application processor and a modem processor may be integrated into the processor 710. The application processor primarily processes the operating system, a user interface, the application program or instructions, and the like. The modem processor primarily processes wireless communication, for example, being a baseband processor. It can be understood that the modem processor may alternatively be not integrated into the processor 710.

The processor 710 is configured to: in a case that first spatial information of a target object is determined based on second spatial information corresponding to a reference resource, and that the reference resource corresponds to multiple pieces of second spatial information, determine that the first spatial information of the target object corresponds to target spatial information, where the target spatial information is one or more of the multiple pieces of second spatial information.

The radio frequency unit 701 is configured to transmit the target object based on determined first spatial information.

In a possible implementation, the target spatial information is one or more pieces of second spatial information having highest signal strength among the multiple pieces of second spatial information; or the target spatial information is one or more pieces of pre-designated second spatial information among the multiple pieces of second spatial information.

In a possible implementation, the reference resource includes multiple reference sub-resources; and the target spatial information is second spatial information corresponding to one or more preset reference sub-resources among the multiple reference sub-resources; or the target spatial information is one or more pieces of second spatial information having highest signal strength among multiple pieces of second spatial information corresponding to the multiple reference sub-resources.

In a possible implementation, a quantity of second spatial information corresponding to a preset reference sub-resource is preset to or agreed to be one or more.

In a possible implementation, the target object has multiple transmission resources, and first spatial information used for transmitting the target object on the multiple transmission resources corresponds, according to a mapping rule, to the multiple pieces of second spatial information included in the target spatial information, where the multiple transmission resources include at least one of the following: multiple transmission resources for time division multiplexing, multiple transmission resources for frequency division multiplexing, multiple transmission resources for space division multiplexing, or multiple transmission resources for code division multiplexing.

In a possible implementation, the target object has one or more transmission resources, and the target spatial information is one of the multiple pieces of second spatial information.

In a possible implementation, if a terminal transmitting the target object is configured with multiple first identifiers, the reference resource and the target object correspond to a same first identifier.

According to the terminal provided in this embodiment of this disclosure, in a case that first spatial information of a target object is determined based on second spatial information corresponding to a reference resource and that the reference resource corresponds to multiple pieces of second spatial information, a communication device determines that the first spatial information of the target object corresponds to one or more of the multiple pieces of second spatial information; and transmits the target object based on the first spatial information corresponding to the one or more of the multiple pieces of second spatial information. In this way, spatial information of an uplink/downlink channel or an uplink/downlink signal can be determined in a case that a reference resource of the uplink/downlink channel or the uplink/downlink signal (namely, the target object) corresponds to multiple pieces of spatial information.

Figure 8:
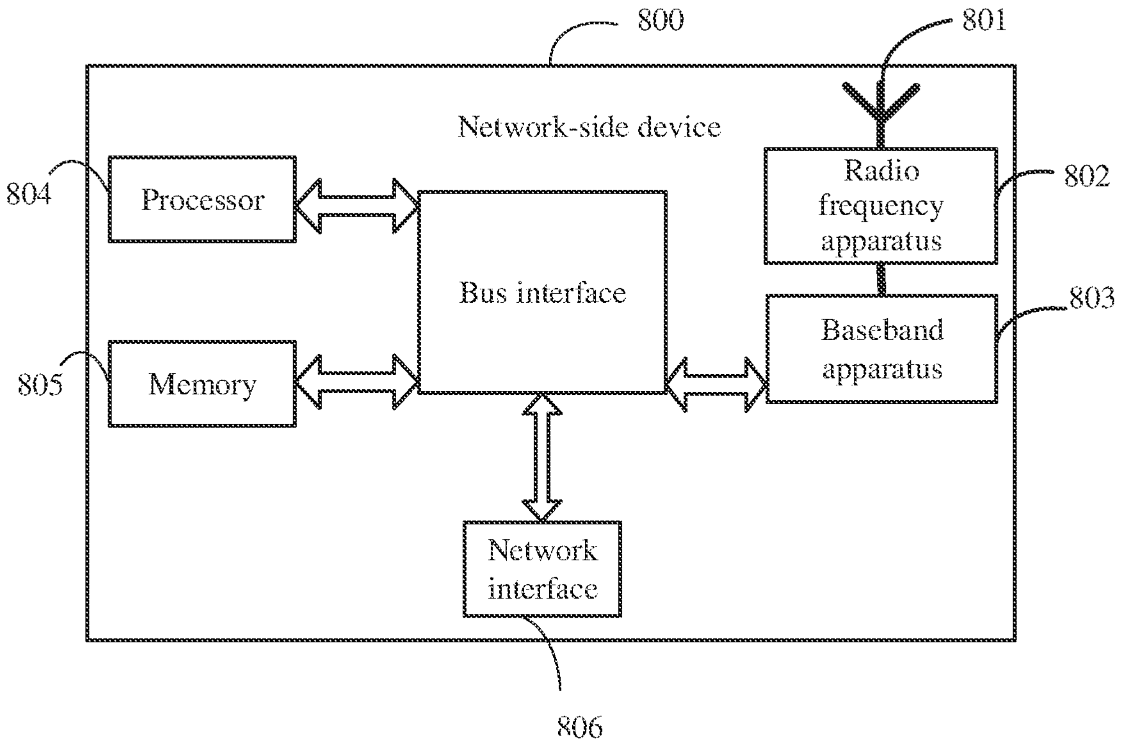
FIG. 8 is a schematic structural diagram of hardware of a network-side device according to an embodiment of this disclosure.

Specifically, an embodiment of this disclosure further provides a network-side device. As shown in FIG. 8, a network-side device 800 includes an antenna 801, a radio frequency apparatus 802, and a baseband apparatus 803. The antenna 801 is connected to the radio frequency apparatus

802. In an uplink direction, the radio frequency apparatus 802 receives information through the antenna 801, and sends the received information to the baseband apparatus 803 for processing. In a downlink direction, the baseband apparatus 803 processes to-be-sent information, and sends the information to the radio frequency apparatus 802. After processing the received information, the radio frequency apparatus 802 sends the information through the antenna 801.

A frequency band processing apparatus may be located in the baseband apparatus 803. The method performed by the network-side device in the foregoing embodiments may be implemented in the baseband apparatus 803. The baseband apparatus 803 includes a processor 804 and a memory 805.

The baseband apparatus 803 may include, for example, at least one baseband processing unit, where multiple chips are disposed on the baseband processing unit. As shown in FIG. 8, one of the chips is, for example, the processor 804, and connected to the memory 805, to invoke a program in the memory 805 to perform operations of the network-side device shown in the foregoing method embodiments.

The baseband apparatus 803 may further include a network interface 806 for exchanging information with the radio frequency apparatus 802. The interface is, for example, a common public radio interface (CPRI).

Illustratively, the network-side device in this embodiment of this disclosure further includes a program or instructions stored in the memory 805 and executable on the processor 804. The processor 804 invokes the program or instructions in the memory 805 to perform the method performed by the modules shown in FIG. 4, with the same technical effects achieved. To avoid repetition, details are not described herein again.

An embodiment of this disclosure further provides a non-transitory readable storage medium. The non-transitory readable storage medium stores a program or instructions. When the program or instructions are executed by a processor, the processes in the foregoing embodiments of the transmission method or the processes in the foregoing embodiments of the method for determining a monitoring occasion are implemented, with the same technical effects achieved. To avoid repetition, details are not described herein again.

The processor is a processor in the communication device in the foregoing embodiment. The non-transitory readable storage medium includes a non-transitory computer-readable storage medium, for example, a computer read-only memory (ROM), a random access memory (RAM), a magnetic disk, or an optical disc.

An embodiment of this disclosure further provides a chip. The chip includes a processor and a communication interface. The communication interface is coupled to the processor. The processor is configured to run a program or instructions of a communication device to implement the processes in the foregoing embodiments of the transmission method or the processes in the foregoing embodiments of the method for determining a monitoring occasion, with the same technical effects achieved. To avoid repetition, details are not described herein again.

An embodiment of this disclosure further provides a computer program product. The computer program product includes a processor, a memory, and a program or instructions stored in the memory and capable of running on the processor. When the program or instructions are executed by the processor, the processes in the foregoing embodiments of the transmission method or the processes in the foregoing embodiments of the method for determining a monitoring occasion are implemented, with the same technical effects achieved. To avoid repetition, details are not described herein again.

It should be understood that the chip mentioned in this embodiment of this disclosure may also be referred to as a system-level chip, a system chip, a chip system, or a system-on-chip.

It should be noted that in this specification, the term "include", "comprise", or any of their variants are intended to cover a non-exclusive inclusion, so that a process, a method, an article, or an apparatus that includes a list of elements includes not only those elements but also other elements that are not expressly listed, or further includes elements inherent to such process, method, article, or apparatus. In the absence of more restrictions, an element defined by "including a . . . " does not exclude another same element in a process, method, article, or apparatus that includes the element. Furthermore, it should be noted that, in the scope of the method and apparatus in the embodiments of this disclosure, execution of the functions are not limited to the order shown or described, and the functions may alternatively be executed in a substantially simultaneous manner or in a reverse order depending on the functions involved. For example, the described method may be performed in an order different from that described, and various steps may be added, omitted, or combined. In addition, features described with reference to some examples may be combined in other examples.

According to the description of the foregoing implementations, persons skilled in the art can clearly understand that the method in the foregoing embodiments may be implemented by software in addition to a necessary universal hardware platform or by hardware only. In most cases, the former is an example implementation. Based on such an understanding, the technical solutions of this disclosure essentially or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to these embodiments. The embodiments are merely illustrative rather than restrictive. As inspired by this disclosure, persons of ordinary skill in the art may develop many other manners without departing from the principle of this disclosure and the protection scope of the claims, and all such manners fall within the protection scope of this disclosure.

What is claimed is:

1. A transmission method, comprising:

for first spatial information of a physical downlink shared channel (PDSCH) is not indicated in downlink control information (DCI), and for a symbol interval between a physical downlink control channel (PDCCH) where DCI is located and a PDSCH scheduled by the PDCCH is greater than or equal to a first threshold value, determining, by a communication device based on second spatial information corresponding to multiple transmissions of the PDCCH, target spatial information of the PDSCH; wherein the target spatial information of the PDSCH is one of multiple pieces of second spatial information corresponding to the multiple transmissions of the PDCCH, wherein the multiple transmissions of the PDCCH are used to schedule the PDSCH; and the multiple transmissions of the PDCCH belong to different search spaces, each search space is associated with a corresponding control resource set (CORESET), and each CORESET corresponds to one piece of second spatial information; wherein the target spatial information is second spatial information corresponding to a CORESET having a smallest CORESET identifier (ID) among multiple CORESETs; and transmitting the PDSCH based on the determined target spatial information.

2. The method according to claim 1, wherein the PDSCH has one or more transmission resources.

3. The method according to claim 1, wherein when a terminal transmitting the PDSCH is configured with multiple first identifiers, the CORESET and the PDSCH correspond to a same first identifier.

4. The method according to claim 1, wherein the CORESET and the PDSCH are in a same time unit.

5. The method according to claim 4, wherein one time unit comprises any one of following: one slot, multiple slots, some orthogonal frequency division multiplexing (OFDM) symbols in one slot, and some OFDM symbols in multiple slots.

6. The method according to claim 1, wherein the first spatial information comprises one of following: a transmission configuration indication (TCI) state, quasi co-location (QCL), and a spatial relationship.

7. A communication device, comprising a processor, a memory, and a program or instructions stored in the memory and executable on the processor, wherein the program or the instructions, when executed by the processor, cause the communication device to perform:

for first spatial information of a physical downlink shared channel (PDSCH) is not indicated in downlink control information (DCI), and for a symbol interval between a physical downlink control channel (PDCCH) where DCI is located and a PDSCH scheduled by the PDCCH is greater than or equal to a first threshold value, determining target spatial information of the PDSCH based on second spatial information corresponding to multiple transmissions of the PDCCH; wherein the target spatial information of the PDSCH is one of multiple pieces of second spatial information corresponding to the multiple transmissions of the PDCCH, wherein the multiple transmissions of the PDCCH are used to schedule the PDSCH; and the multiple transmissions of the PDCCH belong to different search spaces, each search space is associated with a corresponding control resource set (CORESET), and each CORESET corresponds to one piece of second spatial information; wherein the target spatial information is second spatial information corresponding to a CORESET having a smallest CORESET identifier (ID) among multiple CORESETs; and transmitting the PDSCH based on the determined target spatial information.

8. The communication device according to claim 7, wherein the first spatial information comprises one of following: a transmission configuration indication (TCI) state, quasi co-location (QCL), and a spatial relationship.

9. The communication device according to claim 7, wherein the PDSCH has one or more transmission resources.

10. The communication device according to claim 7, wherein when a terminal transmitting the PDSCH is configured with multiple first identifiers, the CORESET and the PDSCH correspond to a same first identifier.

11. The communication device according to claim 7, wherein the CORESET and the PDSCH are in a same time unit.

12. The communication device according to claim 11, wherein one time unit comprises any one of the following: one slot, multiple slots, some orthogonal frequency division multiplexing (OFDM) symbols in one slot, and some OFDM symbols in multiple slots.

13. A non-transitory readable storage medium storing a program or instructions, wherein the program or the instructions, when executed by a processor of a communication device, cause the communication device to preform:

for first spatial information of a physical downlink shared channel (PDSCH) is not indicated in downlink control information (DCI), and for a symbol interval between a physical downlink control channel (PDCCH) where DCI is located and a PDSCH scheduled by the PDCCH is greater than or equal to a first threshold value, determining target spatial information of the PDSCH based on second spatial information corresponding to multiple transmissions of the PDCCH; wherein the target spatial information of the PDSCH is one of multiple pieces of second spatial information corresponding to the multiple transmissions of the PDCCH, wherein the multiple transmissions of the PDCCH are used to schedule the PDSCH; and the multiple transmissions of the PDCCH belong to different search spaces, each search space is associated with a corresponding control resource set (CORESET), and each CORESET corresponds to one piece of second spatial information; wherein the target spatial information is second spatial information corresponding to a CORESET having a smallest CORESET identifier (ID) among multiple CORESETs; and transmitting the PDSCH based on the determined target spatial information.

14. The non-transitory readable storage medium according to claim 13, wherein the PDSCH has one or more transmission resources.

15. The non-transitory readable storage medium according to claim 13, wherein when a terminal transmitting the PDSCH is configured with multiple first identifiers, the CORESET and the PDSCH correspond to a same first identifier.

16. The non-transitory readable storage medium according to claim 13, wherein the CORESET and the PDSCH are in a same time unit.

17. The non-transitory readable storage medium according to claim 16, wherein one time unit comprises any one of the following: one slot, multiple slots, some orthogonal frequency division multiplexing (OFDM) symbols in one slot, and some OFDM symbols in multiple slots.

18. The non-transitory readable storage medium according to claim 13, wherein the first spatial information comprises one of following: a transmission configuration indication (TCI) state, quasi co-location (QCL), and a spatial relationship.

* * * * *